United States Patent
Tirumalareddy et al.

(10) Patent No.: US 8,577,134 B2
(45) Date of Patent: Nov. 5, 2013

(54) METHOD AND SYSTEM OF FACILITATING SEARCH BY COLOR

(75) Inventors: Sundeep Tirumalareddy, Santa Clara, CA (US); Hayrettin Kolukisaoglu, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1244 days.

(21) Appl. No.: 11/835,337

(22) Filed: Aug. 7, 2007

(65) Prior Publication Data
US 2009/0041345 A1    Feb. 12, 2009

(51) Int. Cl.
*G06K 9/00*    (2006.01)
(52) U.S. Cl.
USPC .................... 382/165; 345/589; 705/26.1
(58) Field of Classification Search
USPC ................. 382/162, 165; 345/589; 705/26.1
See application file for complete search history.

(56) References Cited

U.S. PATENT DOCUMENTS

| 6,226,648 B1* | 5/2001 | Appleman et al. ............... 1/1 |
| 6,351,557 B1* | 2/2002 | Gonsalves ................ 382/167 |
| 2002/0087426 A1* | 7/2002 | Shiitani et al. ................. 705/26 |
| 2005/0068331 A1* | 3/2005 | Sekiguchi et al. ........... 345/589 |
| 2008/0046410 A1* | 2/2008 | Lieb ................................. 707/3 |
| 2008/0154747 A1* | 6/2008 | Tarbell et al. .................. 705/27 |

\* cited by examiner

*Primary Examiner* — David Zarka
*Assistant Examiner* — Eueng-Nan Yeh
(74) *Attorney, Agent, or Firm* — Hickman Palermo Truong Becker Bingham Wong LLP

(57) ABSTRACT

A system and method of facilitating search by color processes an image of an item to obtain its color space parameter values and/or color names based on the color space parameter values, and adds the color space parameter values and/or color names as color attribute of the item. When a user inputs a color as a search criterion, the method searches the color attributes of items, and returns a list of items matching the color selected by the user.

16 Claims, 5 Drawing Sheets

| Item | Brand | Category | Sub-category | Primary color HSV Values | Primary color names | Secondary color HSV values | Secondary color names | Seller |
|---|---|---|---|---|---|---|---|---|
| 1001 | Green Cross | Shoes | Boots | | Dark Brown | | | Green Cross |
| 1002 | Adidas | Shoes | Running | 120°/100.0%/39.2 | Green | | | Adidas |
| 1003 | Calvin Klein | Apparel | Dress | | Green | | | Nordstrom |
| 1004 | J.Crew | Apparel | Shirt | | Light Green | | White | J.Crew |
| 1005 | | Apparel | Casual | | Blue | | | Redenvelope |

METHOD AND SYSTEM OF FACILITATING SEARCH BY COLOR

CROSS REFERENCE TO RELATED APPLICATIONS

This application is related to U.S. patent application Ser. No. 11/835,341, filed on the same day as the instant application and entitled "Method and System of Providing Recommendations during Online Shopping," which is hereby incorporated by reference in its entirety.

BACKGROUND

1. Field of the Invention

The present invention relates generally to computer data search, and more particularly to a method of providing one or more color attributes to items to make them searchable by color.

2. Description of Related Art

One advantage of online shopping is that it allows users to easily search and compare merchandise on various seller websites. In addition to enabling users to search products by product categories and/or brands, some websites have a search by color feature to help users to locate products more quickly.

Existing search by color techniques often provide unsatisfactory results, because they are based on text, and not on actual color. In one example, a user may be looking for a pair of green shoes and may input keywords "green" and "shoes" in the search box on the screen of an online shopping system. The system may search text descriptions of products for the keywords "green" and "shoes," and then may provide a list of all products whose text descriptions include the words "green" and "shoes." The list may mistakenly include Green Cross™ brand brown shoes, because the brand includes the word "green" and the brand name is a part of the text description of the shoes. Consequently, the list may be longer than it should be, and may be inaccurate.

Another problem of existing search by color techniques is that different online shopping websites may refer to the same color using different words. For example, different websites may refer to the color maroon as "dark red," "crimson," or "reddish brown". The use of different names may prevent complete identification of matching colors, or may again provide inaccurate results (e.g. when searching for brown items, something that is "reddish brown," but which is actually maroon, may be identified).

One result of the use of different syntax is that a user may describe a color differently from the way a website may. For example, if a user inputs "dark green shoes" into the search box of an online shopping website, but the website does not differentiate among shades of colors and does not include words "light" or "dark" in product text descriptions, the website may return results that show green shoes, but not dark green shoes. Consequently, a pair of shoes perfectly matching the user's requirements may be erroneously excluded from the list of shoes provided to the user.

A further problem of existing search by color techniques is that not all product text descriptions have explicit color information. If a website defines a Gucci™ handbag as "signature GG fabric," this handbag may not be included in the list provided to a user looking for a light brown handbag, although it is known that the color of the signature GG fabric is light brown.

Therefore, a search by color method providing more accurate search results would be desirable.

BRIEF DESCRIPTION OF THE DRAWING FIGURES

Embodiments of the present invention are described herein with reference to the accompanying drawings, similar reference numbers being used to indicate functionally similar elements.

FIG. 3 shows an attribute information database table according to an embodiment of the present invention.

DETAILED DESCRIPTION

The present invention provides a search by color method which processes an image of an item to obtain its color space parameter value(s) and/or color name(s) based on the color space parameter value(s), and then adds the color space parameter value(s) and/or color name(s) as color attribute of the item. When a user inputs a color as a search criterion, the method searches color attributes of available items, and returns a list of items matching the user's selected color. The search by color method of the present invention is based on the color space parameter value(s) of the dominant color(s) of the image of an item, instead of on a textual description of the item. The invention makes the search results more accurate. The invention could be carried out by computer-executable instructions, such as program modules. Advantages of the present invention will become apparent from the following detailed description.

Figure 1:
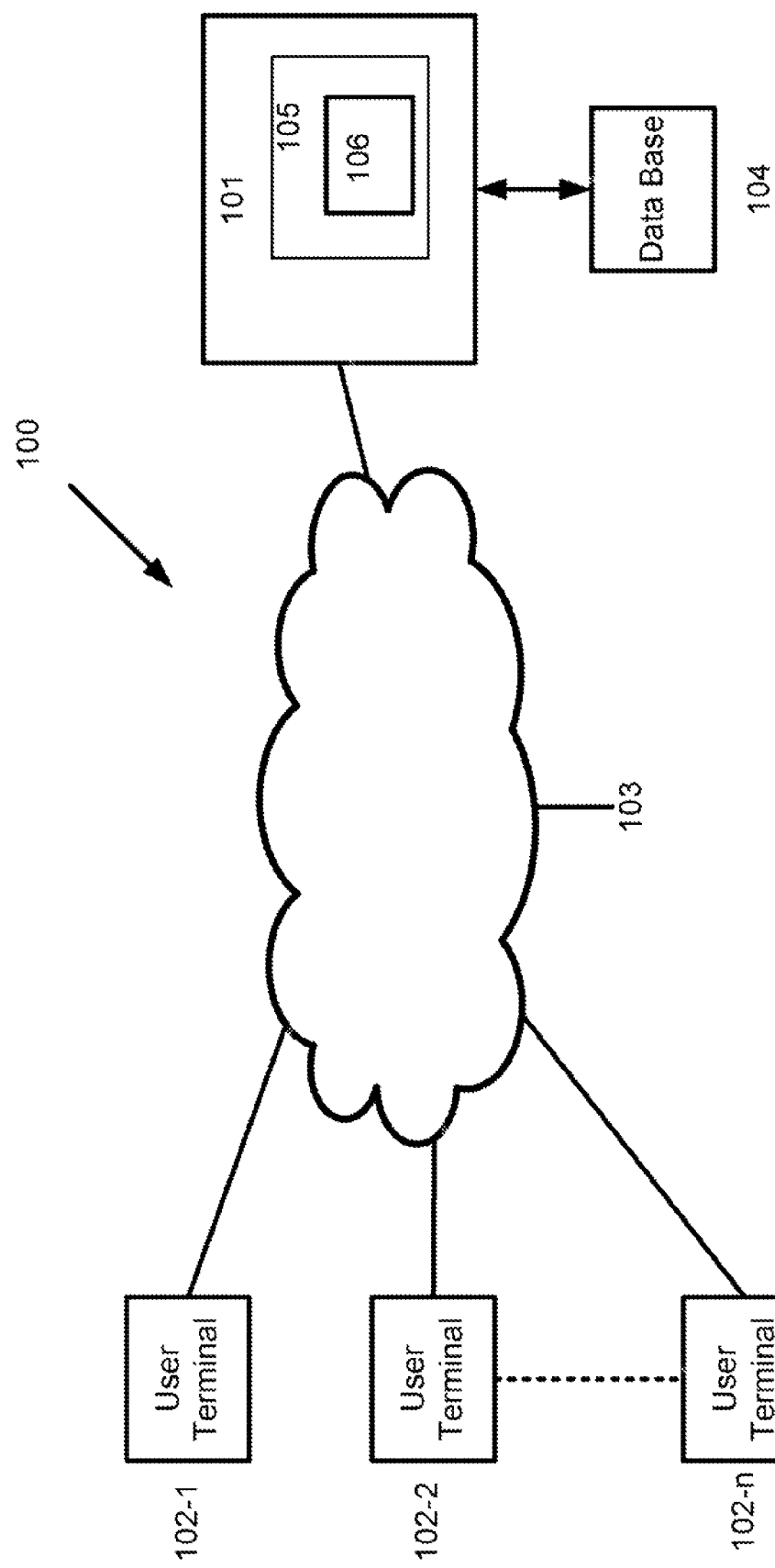
FIG. 1 illustrates an online shopping system according to an embodiment of the present invention.

FIG. 1 illustrates an online shopping system according to an embodiment of the present invention. The online shopping system 100 may have a server 101, with which a number of user terminals 102-1, 102-2, 102-3 . . . 102-*n*, not necessarily part of the system 100, may communicate over a network 103. The server 101 accesses data in an attribute information database 104. The server 101 may be a computer system, which can include one or more of a screen, an input device, a processing unit 105, a system memory, ports for communicating with the network 103, and a system bus coupling various components in the computer system. The processing unit 105 may include or be coupled to a color data extracting unit 106 which may receive images from a storage device or a port connected to the network 103. The processing unit 105 may be configured to execute various methods, including those shown in FIGS. 2, 4 and 5. The color extracting unit 106 may process an image of an item to obtain color data of the item. The processing unit 105 may receive the color data from the color data extracting unit 106 and associate the color data with the item. The user terminals 102 may be personal computers, handheld or laptop devices, microprocessor-based systems, set top boxes, or programmable consumer electronics.

Although the embodiment shown in FIG. 1 is implemented over the Internet, it should be understood that the method may be used to search data in another computer over other types of networks (e.g., Intranet), or data saved in a stand-alone computer or in an external storage device connected to a computer.

Figure 2:
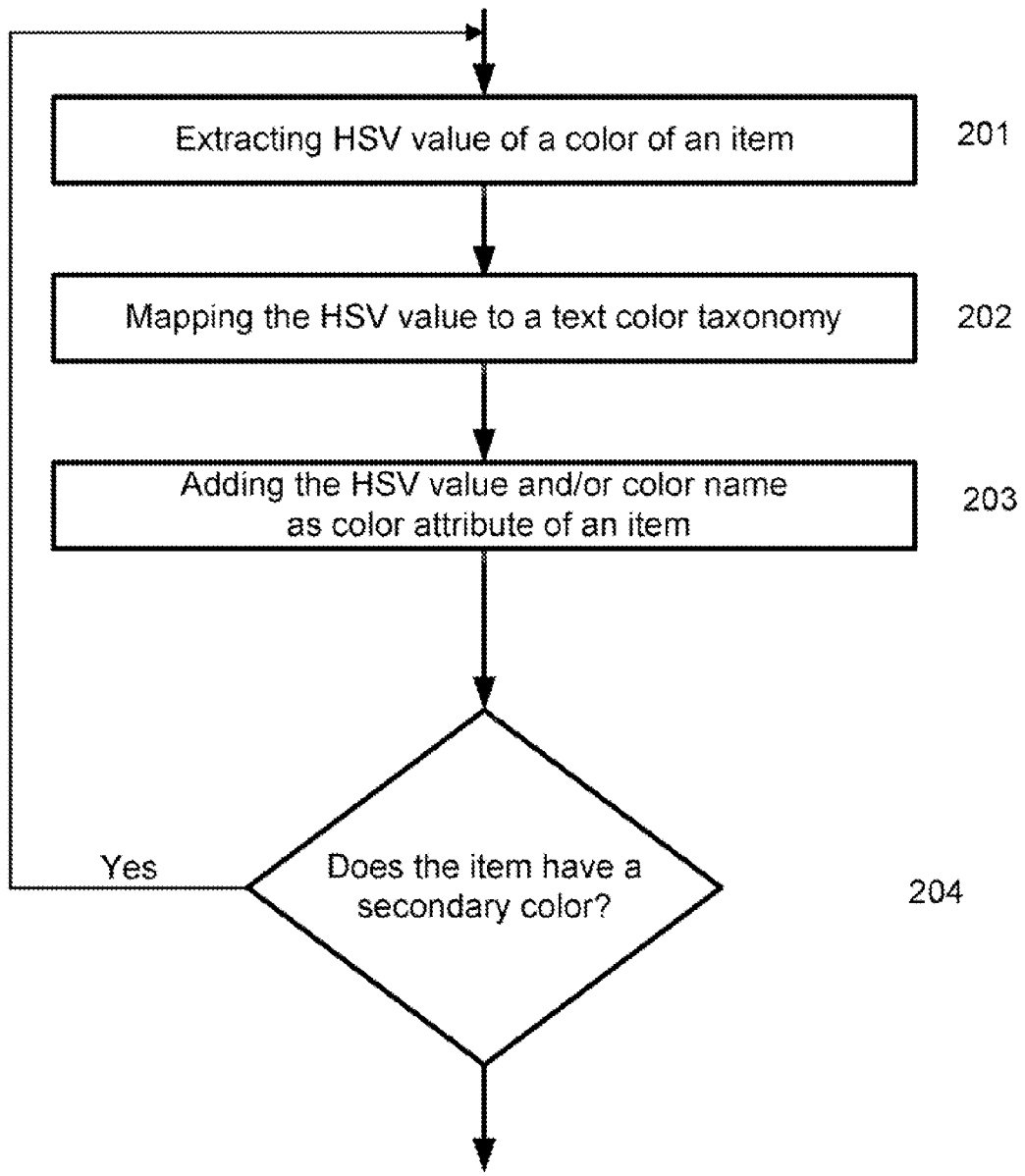
FIG. 2 illustrates a flowchart of a method for generating an attribute information database according to one embodiment of the present invention.

FIG. 2 illustrates a flowchart of a method for generating an attribute information database according to one embodiment of the present invention.

At 201, the server 101 may obtain an image of an item, for example, a pair of Adidas™ shoes, and may process the image to extract color space or color model parameter values of the primary color of the shoes. In one embodiment, the color model may be the HSV (Hue, Saturation, Value) model, which is also known as the HSB (Hue, Saturation, Brightness) model. The HSV model separates color into three parameters. Hue (H) defines the color and may range from 0 to 360°. Each H value corresponds to one color, e.g., 0° is red, and 55° is a shade of yellow. Saturation (S) defines the intensity of the color and ranges between 0-100%, wherein 0 means no color (e.g., a shade of gray between black and white), and 100 means intense color. Value (V) defines the brightness of the color and may range between 0-100%, wherein 0 corresponds to black, and 100 may be white or a more or less saturated color. The HSV value for the Adidas™ shoes in this example is 120°/100.0%/39.2%. It should be understood that the color model could also be the HLS (Hue, Saturation, Lightness) model or the RGB (Red, Green and Blue) model. There are other color models and color spaces that are based, to a greater or lesser extent, on primary colors. These also are within the scope of the invention.

At 202, the HSV value obtained at 201 may be mapped to a text color taxonomy. The text color taxonomy names each HSV value with one or more words, e.g., an HSV value (3°/95%/95%) may be called bright intense red or bright red, an HSV value (120°/100.0%/39.2%) may be called dark green, an HSV value (120°/80%/72%) may be called green, an HSV value (110°/55%/95%) may be called light green, an HSV value (240°/0%/100%) may be called white, an HSV value (240°/100.0%/80%) may be called blue, and an HSV value (330°/55%/42%) may be called dark brown.

At 203, the HSV value and/or the color names are added as color attribute information for the scanned item in an attribute information database.

If it is decided at 204 that the item has multiple colors, 201-203 may be repeated as desired, appropriate, or necessary.

As will be discussed in detail below, the process for obtaining color space parameter value(s) and/or color name(s) of an item and saving the obtained information in the attribute information database may be performed before a user starts a search, or after the user starts a search.

FIG. 3 shows an attribute information database table according to an embodiment of the present invention. Each row may contain information about an item which has been processed by the system 100 to obtain attribute information. Each column may contain data representing one type of attribute information of the item, e.g., category, brand, color and seller. The color attribute information may be color space parameter values or color names or both. As shown, an item 1001 is a pair of Green Cross™ brand shoes, which are dark brown with an HSV value of (330°/55%/42%). An item 1002 is a pair of Adidas™ shoes, which are dark green with an HSV value of (120°/100.0%/39.2%). An item 1003 is a dress, which is green with an HSV value of (120°/80%/72%). An item 1004 is a shirt, which is light green with an HSV value of (110°/55%/95%). An item 1005 is a hoodie, shown on the Redenvelope™ website, which is blue with an HSV value of (240°/100.0%/80%).

It should be understood that the database table may use more or fewer types of attribute data for the items. The database table shown in FIG. 4 may include a column "Subcategory" to further define the items. As shown, the subcategory for the Adidas™ shoes is "running." In addition, for an item having more than one color, the color attribute information may include information for a primary color and information for a secondary color. For item 1004, the primary color is green, and the secondary color is white.

Figure 4:
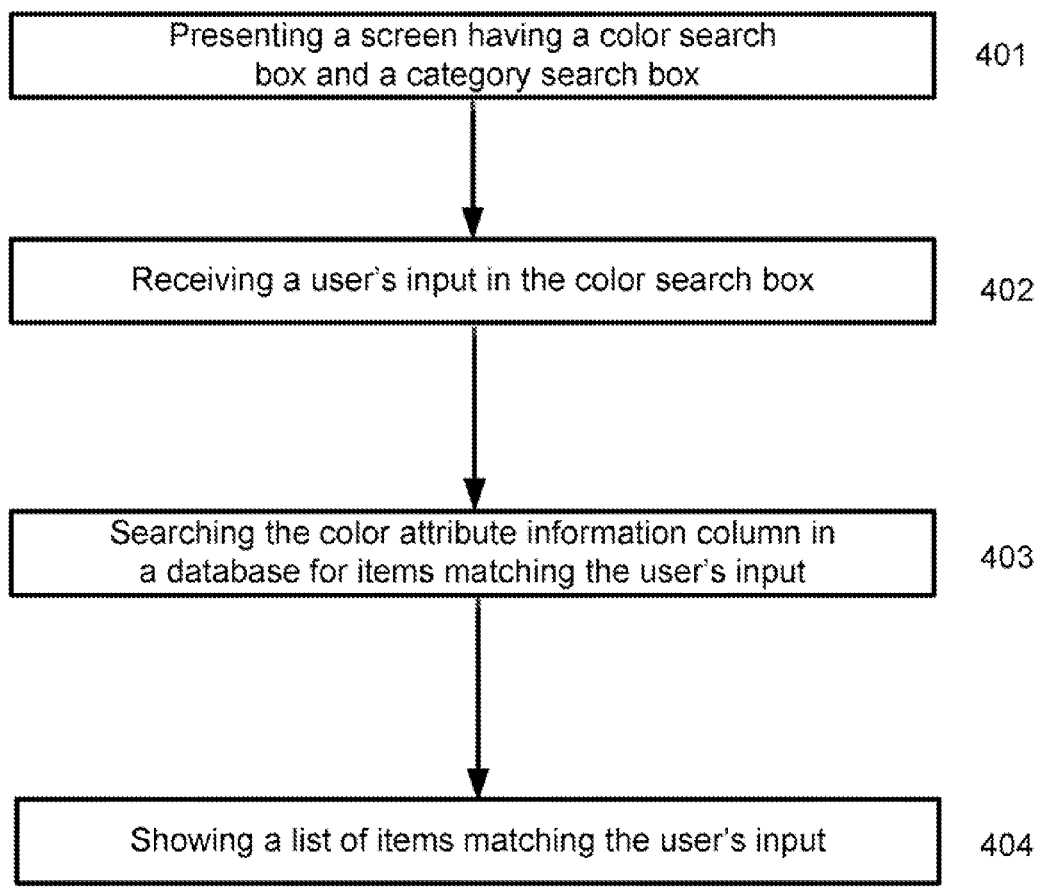
FIG. 4 is a flowchart of a search by color method according to one embodiment of the present invention.

FIG. 4 is a flowchart of a search by color method according to one embodiment of the present invention.

At 401, a screen having a color search box and a category search box may be displayed, so that a user may input, respectively, the color and category of an item he/she is interested in.

At 402, the user may type in "green" in the color search box and "shoes" in the category search box. The user input may be sent to the server 101.

At 403, the server 101 may search a previously generated attribute information database 104, and in particular color and category fields for green shoes. The server 201 may search only the color name column of the attribute information database for the word "green." Consequently, although the item 1001 saved in the database is a pair of brown Green Cross™ boots, since the word "green" is in the field for brand, not the field for color name, the server 101 would ignore item 1001.

At 404, items meeting both requirements may be shown to the user. The list may include the item 1002, the Adidas™ shoes whose color name includes "green". The list may not include the item 1001, although its brand—Green Cross™—includes the word "green". Because the HSV values of the items are obtained, the color names are given based on the HSV values, and only the color name column is searched, the search by color method shown in FIG. 4 provides a more accurate result.

In one embodiment, the user may input the words "green shoes" as a single query, rather than inputting the words separately as described above. The server 101 may search all columns of the attribute information database for the words "green" and "shoes", but may show the items having the word "green" in the color name column first. Consequently, although the item 1001 saved in the database is a pair of brown Green Cross™ boots, since the word "green" is in the field for brand, not the field for color name, the server 101 would ignore item 1001, or push item 1001 down below the shoes having the word "green" in the color name column.

In one embodiment, the list may only include items whose color names were input by the user in the color search box. When the user inputs "green," items whose color name includes green (e.g. "dark green," "light green") may be shown. In one embodiment, only items called "green" may be shown, and "dark green" items, for example, may be excluded.

If there is no such item in the database, the server may ask the user to choose different search criteria.

Figure 5:
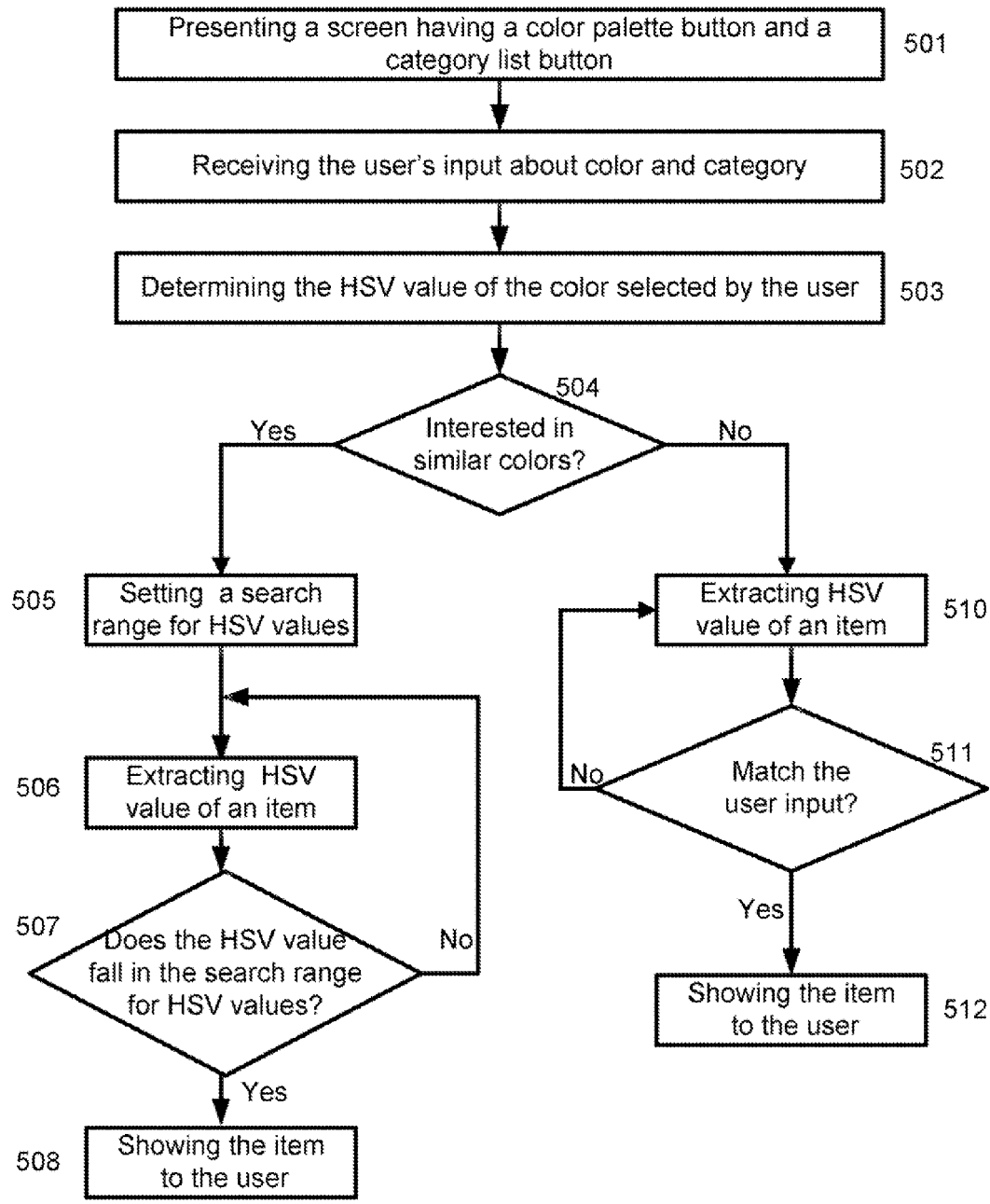
FIG. 5 is a flowchart of a search by color method according to another embodiment of the present invention.

FIG. 5 is a flowchart of a search by color method according to another embodiment of the present invention. The colors and items referred to in the description of FIG. 5 are provided solely for purposes of clarity and ease of understanding, and are not intended to limit the colors or articles to which the invention may be applied.

At 501, a screen having a color search box and a category search box may be displayed. The screen may also have a color palette button and a category button. When a user clicks on the color palette button, a color palette may be displayed to enable the user to select a color by clicking on the color palette. When the user clicks on the category button, a pull-down category list may be displayed for the user to select a category.

At 502, just as an example, the user may click on a dark green color on the palette to select that color and may click on shoes in the pull-down category list. The user input may be sent to the server 101.

At 503, the server 101 may decide that the HSV value of the dark green color selected by the user is 120°/100.0%/39.2%. Since the user input is the color, not the color name, the server 101 may base the search on the HSV value, instead of the color name.

At 504, a screen may be shown to ask the user whether he/she is interested in similar colors. If the answer is yes, at 505, the server 101 may set the search range for the HSV parameters as: H: 118°-122°; S: 97.0%-100.0%; and V: 38.2%-40.2%, for example, to capture ranges or shades of "dark green". An item may be shown to the user when its HSV value falls into the search range.

At 506, the server 101 may obtain an image of a pair of shoes. In one embodiment, the color data extracting unit 106 in the server may scan the image of the shoes to extract their HSV value, e.g., 119°/96%/38.3%. In another embodiment, the color data extracting unit 106 may extract color data from computer data used to represent the image of the shoes. The color data extracting unit 106 may focus on the central area of the image, so that the background of the image may not interfere with extraction of the HSV value.

At 507, the server 101 may decide whether the HSV value of the shoes falls into the search range set at 505. Since it does, the shoes may be shown to the user at 508. Otherwise, the process may return to 506 to extract the HSV value of another item.

If at 504, the user indicates that he/she is not interested in similar colors, the server 101 may obtain an image of a pair of shoes and extract its HSV value 119°/96%/38.3% at 510. It may be determined at 511 whether the obtained HSV value matches the HSV value of the color input from the user. Since the HSV value does not exactly match the color input from the user, this pair of shoes may not be shown to the user, and the process may return to 510. If the HSV value matches the user input, the pair of shoes may be shown to the user at 512.

Since the user selects a color from the palette, the server 101 may decide the HSV value of the selected color, and use the HSV value to decide whether a pair of shoes scanned match the user input. The step for searching the text color taxonomy may be saved.

Accordingly, the present invention processes the image of an item to obtain its color information, and uses the obtained color information to facilitate search by color.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. For example, although the disclosed embodiments relate to apparel shopping, the inventive method may be used to search for other shopping items saved in computer systems, including but not limited to artwork, furniture, furnishings, appliances, sporting goods, motor vehicles, etc. Therefore, it is intended that the invention be considered as limited only by the scope of the appended claims.

What is claimed is:

1. A method comprising:
   storing, in an attribute information database, color parameter values for items;
   wherein storing color parameter values for items includes, for each item of a plurality of items, storing, in association with the item, at least one color parameter value that represents a color of the item;
   receiving, from a user, a search request identifying a particular color;
   querying whether the user is interested in similar colors;
   in response to an indication that the user is interested in similar colors:
      determining a color parameter value range based on the particular color identified by the search request;
      searching the attribute information database for items having a color parameter value that falls within the color parameter value range; and
      in response to the search request, displaying one or more items that are associated with color parameter values that fall within the color parameter value range;
   in response to an indication that the user is not interested in similar colors:
      searching the attribute information database for items having a color parameter value that exactly matches the particular color identified by the search request; and
      in response to the search request, displaying one or more items that are associated with color parameter values that exactly match the particular color identified by the search request;
   wherein the method is performed by one or more computing devices.

2. The method of claim 1, wherein the color parameter value range is set around a plurality of color parameter values that map to a same color name.

3. The method of claim 1, wherein the one or more items are items that are shown on an online shopping website.

4. The method of claim 1, further comprising:
   processing images of the one or more items to determine the color parameter values.

5. The method of claim 1, wherein the color parameter value range is a first range of values for a hue component, a second range of values for a saturation component, and a third range of values for a value component, wherein a color parameter value falls within the color parameter value range if a particular hue component of the color parameter value falls within the first range, a particular saturation component of the color parameter value falls within the second range, and a particular value component of the color parameter value falls within the third range.

6. The method of claim 1, wherein the color parameter value range is set by a server.

7. The method of claim 1, wherein the color in the search request is a color parameter value selected by the user from a color palette.

8. A server, comprising:
   a processing unit;
   a memory storing instructions that, when executed by the processing unit, cause the processing unit to perform:
   storing, in an attribute information database, color parameter values for items;
   wherein storing color parameter values for items includes, for each item of a plurality of items, storing, in association with the item, at least one color parameter value that represents a color of the item;

receiving, from a user, a search request identifying a particular color;

querying whether the user is interested in similar colors;

in response to an indication that the user is interested in similar colors:

determining a color parameter value range based on the particular color identified by the search request;

searching the attribute information database for items having a color parameter value that falls within the color parameter value range; and in response to the search request, displaying one or more items that are associated with color parameter values that fall within the color parameter value range;

in response to an indication that the user is not interested in similar colors:

searching the attribute information database for items having a color parameter value that exactly matches the particular color identified by the search request; and in response to the search request, displaying one or more items that are associated with color parameter values that exactly match the particular color identified by the search request.

9. The server of claim 8, wherein the color in the search request is a color parameter value selected by the user from a color palette.

10. A non-transitory computer-readable medium storing instructions, which, when executed by one or more processors, cause performance of:

storing, in an attribute information database, color parameter values for items;

wherein storing color parameter values for items includes, for each item of a plurality of items, storing, in association with the item, at least one color parameter value that represents a color of the item;

receiving, from a user, a search request identifying a particular color;

querying whether the user is interested in similar colors;

in response to an indication that the user is interested in similar colors:

determining a color parameter value range based on the particular color identified by the search request;

searching the attribute information database for items having a color parameter value that falls within the color parameter value range; and in response to the search request, displaying one or more items that are associated with color parameter values that fall within the color parameter value range;

in response to an indication that the user is not interested in similar colors:

searching the attribute information database for items having a color parameter value that exactly matches the particular color identified by the search request; and in response to the search request, displaying one or more items that are associated with color parameter values that exactly match the particular color identified by the search request.

11. The non-transitory computer-readable medium of claim 10, wherein the color parameter value range is set around a plurality of color parameter values that map to a same color name.

12. The non-transitory computer-readable medium of claim 10, wherein one or more items are items that are shown on an online shopping website.

13. The non-transitory computer-readable medium of claim 10, further storing instructions that cause performance of:

processing images of the one or more items to determine the color parameter values.

14. The non-transitory computer-readable medium of claim 10, wherein the color parameter value range is a first range of values for a hue component, a second range of values for a saturation component, and a third range of values for a value component, wherein a color parameter value falls within the color parameter value range if a particular hue component of the color parameter value falls within the first range, a particular saturation component of the color parameter value falls within the second range, and a particular value component of the color parameter value falls within the third range.

15. The non-transitory computer-readable medium of claim 10, wherein the color parameter value range is set by a server.

16. The non-transitory computer-readable medium of claim 10, wherein the color in the search request is a color parameter value selected by the user from a color palette.

* * * * *